July 28, 1959 W. J. CAMP 2,897,276
DIAL CONTROL SELECTIVE RINGING APPARATUS
Filed Sept. 13, 1954
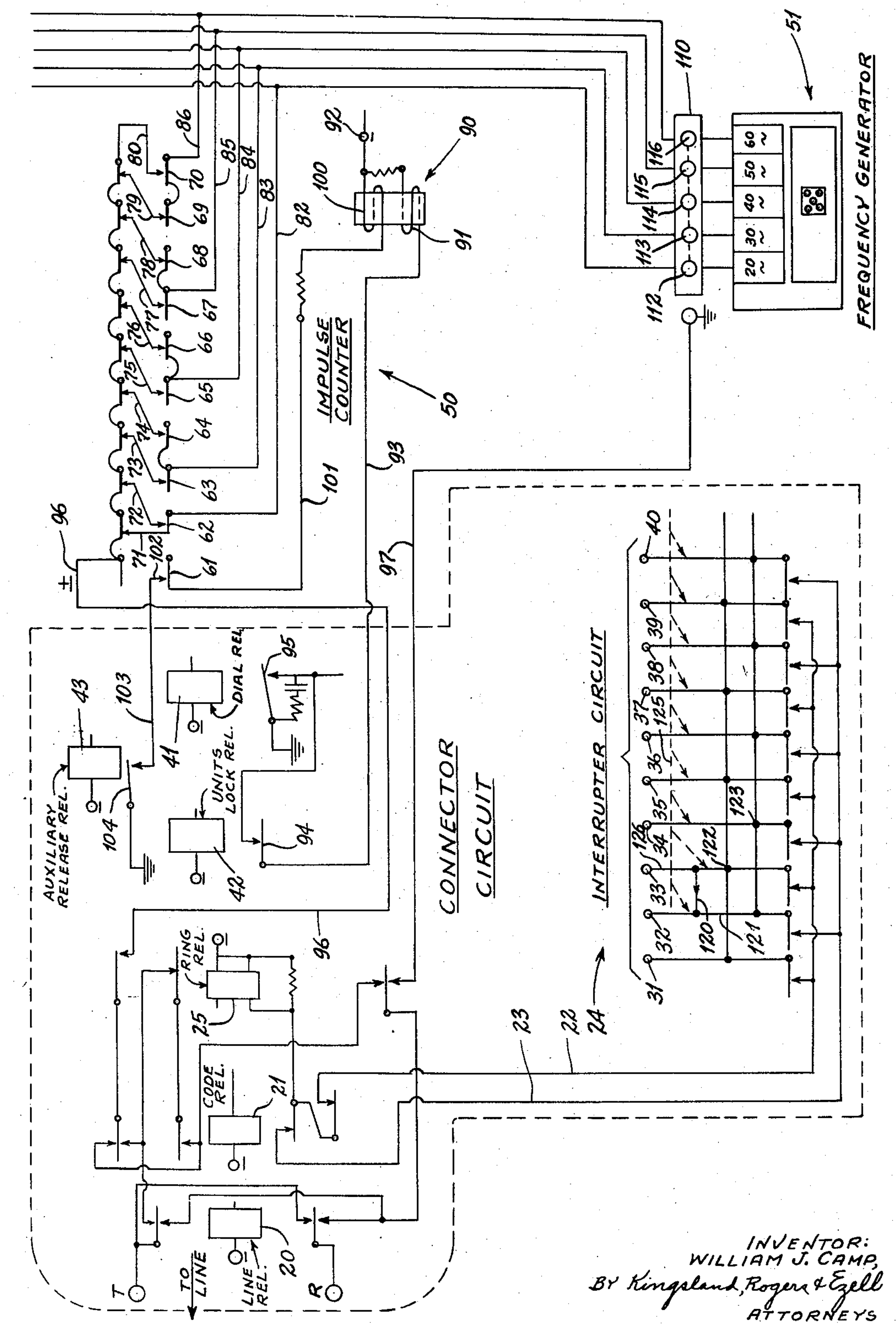
INVENTOR:
WILLIAM J. CAMP,
BY Kingsland, Rogers & Ezell
ATTORNEYS United States Patent Office 2,897,276
Patented July 28, 1959

2,897,276

DIAL CONTROL SELECTIVE RINGING APPARATUS

William J. Camp, Dallas, Tex.

Application September 13, 1954, Serial No. 455,691
13 Claims. (Cl. 179—17)

This invention relates to improvements in telephone frequency ringing apparatus, and in particular is concerned with apparatus for converting code ringing switchboards to selective ringing. The invention contemplates the employment of external ringing apparatus and magnetic impulse counters which can be utilized as a unit and incorporated in conventional dial code ringing switchboards by the changing of only a small number of leads in the switchboard.

It is well konwn that there are a large number of dial code ringing switchboards in use all over the country. This code ringing is of the well known party-line type wherein a series of long and short rings are employed to signal the particular subscriber according to code. All of these rings are heard on a party-line, and it has been a source of inconvenience to subscribers that they must listen to the entire ringing to determine whether or not the code applies to them.

By means of this invention, there has been provided a unit comprising a magnetic impulse counter and a ringing device which is adapted to be utilized in conventional dial code ringing switchboards in such a manner that selective ringing is substituted for the code ringing. In this improvement, the unit is used with each connector circuit with a great simplicity in changeover, since the conventional switchboard mechanism can be used and only a very small number of leads must be changed. The selective ringing is accomplished by using a number of different frequencies which signal only the bells ringing sources, such as in the subscribers' telephones that are energized by the particular ringing source employed. Thus, selective ringing on one frequency to a particular subscriber will not be heard by the other subscribers on the same party-line, due to the fact that different frequencies are employed; whereas in the old type of code ringing, a single frequency heard by all the other subscribers was utilized.

Since only a very small number of the leads need be changed within the switchboard, it is apparent that no intricate rewiring of the switchboard is required to convert the code ringing to the frequency ringing selective service, and this, in turn, obviates the break-down of the equipment and pulling it out of service while the changeover is being made. Further, the conversion may be made by relatively inexperienced personnel and may, if desired, be done in stages, so that partial conversion to the frequency ringing selective service is made while the subscribers' bells are being changed and while those other lines that have not been converted are allowed to remain on code ringing. This feature obviates the tie-up of equipment and repairmen, who, thereby, by means of this invention, can make the conversion at their convenience.

In brief, the invention contemplates the use of standard dial code ringing switchboards in which the last digit pulled determines the type of ringing to be applied. Thus, in four-digit dial code ringing, for example, the last digit determines the number of impulses which are sent in to the code ringing apparatus. In this invention, the impulses which are set up by the last digit are sent into a magnetic impulse counter which is employed in a separate unit and controls the frequency of ringing applied to the subscribers' sets. The frequency sent out by a multiple frequency generator is applied to the same line that was previously used in the single frequency of the code ringing equipment. After the subscriber's set has been rung by the person dialing and after the conversation has been finished, the apparatus, including the magnetic impulse counter, is restored by a novel, knockdown circuit, which is controlled by conventional equipment in the switchboard that is actuated upon the hanging up of the subscriber's set.

It is further contemplated in this invention that a conventional interrupter circuit can be utilized in such a manner that where the same frequency is applied to the tip and ring of the subscriber's line, a coded circuit can be employed on one of the lines to identify which is the tip and which is the ring. This is of advantage to telephone servicemen, who, upon tapping either the tip or ring, can determine, for instance, that a single long ring may identify the tip, whereas two short rings of the same frequency would identify the ring side of the line.

Accordingly, it is an object of this invention to provide an apparatus for converting code ringing dial switchboards to frequency selective ringing switchboards, comprising an external conversion unit which may be connected to a connector circuit within the switchboard without interfering with the internal arrangement of the switchboard.

It is yet a further object of this invention to provide an apparatus for converting code ringing dial switchboards to selective frequency ringing, wherein an external conversion unit comprises a magnetic impulse counter and a multiple frequency ringing source which can be connected to the switchboard by a very small number of leads without changing the circuit arrangement of the switchboard.

Still another object of this invention is to provide an apparatus for converting code ringing to frequency selective ringing wherein a magnetic impulse counter and multiple frequency ringing source are connected together in such a manner as to apply variable ringing to the subscribers' line in controlled response to the last digit dialed by the caller.

A further object of this invention is to provide apparatus for converting code ringing to frequency selective ringing by a conversion unit comprising an impulse counter and a multiple frequency ringing source wherein a knockdown or restoring feature is provided which is responsive to conventional equipment within the switchboard.

Yet another object of this invention is to provide apparatus for converting code ringing to frequency selective ringing, in which the conversion can be made on a set of party lines in a stagewise manner so as to have combined code ringing and frequency selective ringing during the changeover.

Yet a further object of the this invention is to provide unitary apparatus for converting dial code ringing switchboards to frequency selective ringing wherein a magnetic impulse counter and multiple frequency ringing generator are integrated together in such a manner that the conversion apparatus may be connected to a conventional switchboard with a minimum number of changes and without changing the internal circuit arrangement of said switchboard.

Still another object of this invention is to provide a conversion apparatus for converting code ringing dial switchboards to frequency selective ringing wherein the changeover can be made with a unitary apparatus by relatively inexperienced personnel who can make the simple wiring changes in extremely short periods of time and with a minimum of labor and expense involved.

Further objects of this invention will appear in the detailed description which follows and will further be apparent to those skilled in the art.

For the purpose of description, the invention is shown applied to one typical switchboard in which the components affecting the invention are shown in dotted lines. It is to be realized that this is for the purpose of example only, and that the conversion apparatus can be used in other conventional types of code ringing dial switchboards, as will appear below.

The drawing is a wiring diagram of the conversion apparatus, showing it connected to the integrating components of a conventional switchboard shown in dotted lines.

The diagram for the purpose of illustrating this invention shows a magnetic impulse counter in the conversion unit which is connected to a five-frequency ringing generator. This generator has five chosen frequencies at 20, 30, 40, 50 and 60 cycles, which replace the single straight line ringing frequency of the switchboard to be converted, as shown in dotted lines. These five frequencies are adapted to be sent out in a selected manner to ten or less party-line subscribers through the magnetic impulse counter in response to the last digit dialed on either the tip or ring of the line. Likewise, these five frequencies are adapted to be sent out in a selected manner to eleven or more party-line subscribers through the magnetic impulse counter in response to the last digit dialed on either the tip or ring of the line on a semi-selective code ringing basis. In this practice, the odd numbers 1, 3, 5, 7 and 9 are sent out on the tip side of the line and the even numbers 2, 4, 6, 8 and 0 (0 corresponds to 10 and sends out ten impulses) are sent out through the ring side of the line.

In a conventional connector circuit, such as that for the elements shown in the dotted lines, there are only a few components which are necessary for the understanding of this invention. In this connector circuit, there is a line side relay 20 which determines whether ringing frequency is applied to the tip or ring of the line. In addition, there is a coding relay 21 having two leads 22 and 23 for odd and even digits, respectively, which are connected to an interrupter circuit generally indicated at 24. The interrupter circuit has ten terminal connections at 31 through 40, inclusive, which determine in the conventional code ringing circuit the number of long and short rings applied to the line. The interrupter circuit is connected at the top to a conventional cam making and breaking device which effectuates the interruption of the ringing frequency to bring about the long and short coded ringing. The last important component in the ringing circuit is ringing relay 25 which applies the ringing frequency through the other ringing relays (not shown) to the subscribers' line. In the conventional code ringing switchboard only one frequency is applied to relay 25. With this invention any one of a total of five frequencies as dialed into the impulse counter is applied to relay 25.

In the dial mechanism, there is provided a dial relay 41 in the conventional circuit for a four digit system which sends out pulses corresponding to the digit dialed. Associated with this dial is a unit lock relay 42 which operates only upon the third dial pull which controls the dial pulses to the impulse counter. In the conventional circuit, after this relay is operated upon the third dial pull, ringing is applied to the called subscriber's telephone in code in the party-line system as recorded on the fourth dial pull.

To restore the ringing equipment to its normal condition after the subscriber has been contacted and after the call has been completed, the conventional circuit is further provided with an auxiliary release relay 43.

The conversion apparatus comprises a magnetic impulse counter generally indicated at 50 and a multiple frequency ringing generator 51. The magnetic impulse counter may be of the type made by Kellogg Switchboard and Supply Company, and the ringing generator, for the purpose of example, may be any convenient source supplying five different frequencies of A.C. ringing current.

The magnetic impulse counter has a number of contact sets numbered from 61 through 70, inclusive. Each one of these sets includes an upper and a lower spring. All of the upper springs are strapped together, and, in addition, the second spring has a normally made contact 71 between the bottom and lower springs for a reason to appear. Also, it will appear that, starting with the bottom spring of the set 62 and the top spring of the set 63 and ending with the bottom spring of set 69 and the top spring of set 70, there are contacts 72 through 79 connected between adjacent sets which are normally open at the bottom spring and normally made at the top spring. To accommodate for the last set 70, there is a contact 80 which is normally open at the bottom spring and strapped to the top spring.

There are five frequency leads connected to the magnetic impulse counter at the bottom spring of sets 62; 63, 64, 65, 66; 67, 68; and 69 and 70. These leads are 82, 83, 84, 85 and 86, respectively, which carry 20, 30, 40, 50 and 60 cycles of ringing current, or which may carry any five other selected frequencies.

The magnetic impulse counter 50 is further provided with a frequency impulse relay 90 which energizes, according to the number of impulses received, the various contact sets 61 through 70. The relay 90 is provided with an energizing coil 91 connected at one side through a resistance to a common 48-volt D.C. battery source 92. The other side of the coil 91 is connected to a pulse lead 93 leading to a normally open spring contact 94 of the unit lock relay 42 in the connector circuit. This normally open spring contact 94 is connected when made to another normally open spring contact 95 in the dial relay 41 connected to ground at the other end. This completes the making circuit to the energizing coil 91, to furnish pulsing current to the magnetic impulse counter and control the selected frequency ringing.

The selective frequency ringing is actually applied to the connector circuit by A.C. lead 96, which is strapped at one end to the upper spring of set 61 in the magnetic impulse counter. At the other end it is connected to the ringing relay 25. This lead is a substitution for the old single frequency lead in the conventional coded ringing circuit. Likewise, the old ground lead in the code ringing circuit has been changed to a new ground lead 97 which is connected to a ground or common return at the frequency ringing generator 51.

In order to provide for restoration of the selective ringing apparatus, a novel knockdown circuit has been provided. This knockdown circuit includes a knockdown coil 100 which is connected at one end to the common battery source 92 in the frequency impulse relay 90 through a resistor. The other end is connected to the bottom spring of set 61 in the magnetic impulse counter. A normally open contact 102 then leads to the previously described auxiliary release relay 43 in the connector circuit to a normally open contact 104 connected to ground. The knockdown coil 100 is in opposition to the energizing coil 91, so that, upon completion of the call when the knockdown circuit is closed, the magnetic impulse counter can then be restored to normal.

In order to provide for proper changeover of the apparatus from code ringing to frequency selective ringing, a terminal strip 110 at the top of the ringing generator 51, or any other convenient location, has been provided. This terminal strip has five connections 112, 113, 114, 115 and 116 which are connected to the respective leads 82 through 86. At the beginning of the conversion operation, all of these contacts are strapped together and are connected only to the original straight line ringing frequency source in the generator, so that coded ringing is still in effect. For example, when the conversion is desired to be made, the strap between terminals 115 and 116 is first broken and terminal 116 is connected to the 60-cycle ringing source, so that selective ringing is possible for 60 cycles on digits 9 and 0. Thus, the contacts 112, 113, 114, 115 and 116 are all adapted to be connected to the frequency of 20, 30, 40, 50 and 60 cycles separately when the conversion is fully made and after all the straps have been disconnected, as will be apparent upon a further and more complete description of this operation which follows.

The completion of the conversion is effected by altering the strapping arrangement at the contacts in the interrupter circuit from 31 through 40 located on a terminal strip. In the conventional code ringing circuit, codes of long and short rings were applied through these contacts to lines 22 and 23 to the subscribers' line. In the present conversion arrangement, there may be used any type of ring desired, and any single one of the rings from contacts 31 through 40 can be employed by unstrapping all of the other nine contacts to the interrupter circuit and connecting the unstrapped leads in multiple to the single strapped lead. Thus, if a single long is desired, which in the past, for the purpose of example, could have been applied to contact 31 on the cam in the interrupter circuit, this lead would be left intact and all of leads 32 through 40 would be disconnected at the terminal board through the interrupter circuit and, in turn, multipled over to contact 31. This would give the same ring for all of the ten digits dialed, both on tip and ring.

However, for the purpose of line identification by repairmen, it is found to be convenient to be able to readily distinguish tip from ringing by listening to the ringing applied thereto, and accordingly different rings may be wished to be applied to tip and ring. Thus, as shown in the drawing, all of the contacts but two are disconnected from the interrupter circuit terminal board, as has been shown by the dotted line 125 which indicates cutting. It will be noticed that contacts 31 and 33 are left intact. This is because, for the purpose of example, contact 31 will receive one long ring from the interrupter circuit and contact 33 in normal conventional practice, will receive two short rings. Then, since it is desired that all the odd digits have the same ring, contacts 31, 33 (below the interrupter circuit), 35, 37 and 39 will be multipled together at 122 so as to receive a single ring. Then, contact 33, which is still connected at the top to the interrupter circuit by lead 126 is crossed over by leads 120 and 121 to the unstrapped contact 32 which, in turn, is multipled over to contacts 34, 36, 38 and 40 at 123 so that two rings are all received on the even number of digits.

*Operation*

After the conversion apparatus has been installed, the subscriber, who wishes to call by dial another subscriber, performs the dialing operation in the same manner as for code ringing. The only difference is that the called subscriber will be the only one on the party line who hears his ringing, since selected ringing will affect only his attuned single frequency bell.

When the dialing operation is performed, the dial relay 41 operates in the same manner as in the conventional connector circuit. Likewise, the unit lock relay 42 operates in a similar manner and makes the contact 94 only when the third digit is dialed. When this is done, pulsing is sent out from the dial relay for a number of pulses corresponding to the digit dialed. Thus, the contact 95, for example when the digit 1 is dialed, makes one contact and sends out one pulse over the pulse lead 93 through contact 94 into the energizing coil 91 of relay 90 in the impulse counter. When this is done, the lower spring of contact set 61 is made by the energization of the permanent magnet associated with it to set up the knockdown circuit for return to normal when the called subscriber, after being connected, hangs up. Simultaneously, since 20-cycle ringing current through lead 82 is applied through lower spring 62 to the normally made upper contact 71 of the second upper spring, 20-cycle current goes out through the common ringing generator lead 96 to the ringing relay 25 without any operation of contact set 62.

Therefore, ringing is applied and is properly coded as in the past by relay 21 and is sent out to the tip side of the subscriber's line by line side relay 20. This ringing continues until interrupted in the normal manner.

When the subscriber hangs up, auxiliary release relay 43 operates contact 104 so that the knockdown circuit is completed through made contact 102 and lead 101 through knockdown coil 100 in the relay 90. The knockdown coil 100 is stronger than coil 91 and, therefore, causes the spring 61 to return to normal, which breaks contact 102 at this time and then prevents any battery drain after the circuit is returned to this condition.

When the subscriber dials the digit 2, the impulse counter causes both contact sets 61 and 62 to be operated. This makes it possible for 20-cycle current to be sent out through lead 82 to the lower spring 62, the lower made contact of 72, and through the unoperated normally made upper contact of 72 with the upper spring of contact set 63. Thus, 20-cycle current is again sent out in the same manner as before through the generator lead 96.

However, the line side relay 20 and the coding relay 21 will, because the digit dialed is even, cause the ringing current to be sent out in two rings to the ring side of the subscriber's line. The two rings are sent out when digit 2 is dialed due to the change in the interrupter circuit, wherein contact 32 on the terminal board was strapped over by lead 120 to the lead 121 which had previously been connected to the second contact of this board. Because of this arrangement of the interrupter circuit, as previously mentioned, all even dialed digits of the last dial pull will be sent out with one ring, due to the connecting in multiple of contact 31 with all the odd contact leads in the interrupter circuit leading to the coding relay 21. Similarly, all the even dialed digits on the last dial pull will be sent out in two rings due to the connecting in multiple of lead 123 on all even leads. The knockdown restoring feature for the digit 2 is the same as described for the digit 1, since, upon hanging up the receiver, relay 43 is operated, which energizes knockdown coil 100 to restore the impulse counter circuit.

When the digit 3 is dialed on the last dial pull, three impulses are sent through the coil 91, which causes the operation of spring sets 61, 62 and 63. In this condition, upper springs 62 and 63 will both be broken from contacts 71 and 72, respectively. However, the lower spring 63 will be closed against the lower contact of 73 so that 30-cycle ringing current will be supplied therethrough to the upper contact of 73 with the normally made contact of upper spring 64. Therefore, 30-cycle ringing current will be sent out on the tip side of the subscribers' line in one ring, since this is an odd digit.

When the digit 4 is dialed, all the lower springs of 61, 62, 63 and 64 will be operated, and, conversely, the upper springs of 62, 63 and 64 will be broken from their respective contacts. Therefore, ringing current will be sent out on 30 cycles through spring 63 to its strapped-over position with spring 64 to the upper contact of 74 with upper spring 65, to the ring side of the subscribers' line. In like manner, 40-cycle ringing current is sent out on the tip and ring side of the line respectively when the digits 5 and 6 are dialed, and 50-cycle is sent out on the tip and ring side when the digits 7 and 8 are dialed.

It will be noted that when the digit 9 is dialed, the same arrangement prevails and only a slight change occurs when the digit 0, corresponding to ten impulses, is dialed, since, at this time, the lower spring 70 will supply the ringing current in 60 cycles to this made contact, and to a strap on contact 80 with the upper spring 70. Then the ringing is sent out on the ring side of the line through generator lead 96 to the previously mentioned relays in the connector circuit as before.

The actual process and manner of converting the switchboard is very simple. The terminal board 110 at the top of the frequency ringing generator 51 greatly simplifies the cutting in procedure. Thus, at the very beginning, all the leads 82 through 86 are strapped over to 20 cycles so that at the very beginning of the conversion process there is still code ringing applied to all the last dialed digits 1 through 9 and 0, making ten digits. When the actual time for conversion comes, the strap connecting contacts 115 and 116 are cut and contact 116 is connected to 60-cycle ringing current in the frequency ringing generator. This supplies 60-cycle ringing current through lead 86 to springs 69 and 70. At the same time, contacts 39 and 40 on the interrupter circuit terminal board can be cut and transferred over to their respective multiples connecting with contacts 31 and 32, respectively, which will give the ring of one ring and two rings when 9 and 0 are dialed. Thus, the bell on the subscriber's telephone, which will be changed to a 60-cycle bell, will be selective when the strap leading to contact 116 on the terminal board is cut. Alternatively, it may be desired to leave the strapping over and cutting of the leads on the interrupter circuit to a later time, and the same number of rings will be applied to the new, 60-cycle frequency, but since the bells are selective, this ringing will not be heard on other subscribers' phones. Conversely, the rings from digits 1 through 8 will not be heard when digits 9 and 0 are dialed.

In the same manner, digits 7 and 8 may be made selective ringing on 50-cycle current by cutting the strap between contacts 114 and 115 on the generator terminal board, while connecting contact 115 with the 50-cycle frequency. Then the contacts 37 and 38 may in the same manner as previously described be lifted from the interrupter circuit terminal board and multipled in with contacts 31 and 32. This procedure can then be repeated until the last strap leading from contact 112 to 113 is cut, which gives full selective ringing at this time to all the digits 1, 2, 3 and 4.

It will be noted that the whole conversion has been effected with the actual addition from the conventional connector circuit to the conversion apparatus of only two leads. Thus, the knockdown lead 103 leading between relay 43 and the spring 61 of the magnetic impulse counter has been added, as has also been added the pulsing lead 93 leading from the relay 90 to the contact 94 of the unit lock relay 42. The remainder of the circuit for the pulsing relay is internal within the connector circuit leading from contact 94 of the relay 42 to the contact 95 of the dial relay 41.

These two mentioned leads 103 and 93 are additional and only two other modifications, which are substitutions between the conventional connector circuit and the conversion apparatus, are required. Thus, the common generator ground or common return lead 97 is connected to the frequency ringing generator 51 instead of the old 20-cycle ringing generator and the lead 96, which is the hot wire of the generator, is connected to the magnetic impulse counter at upper spring 61. The remainder of the wiring between the magnetic impulse counter and the frequency ringing generator is within the conversion apparatus itself, which may be supplied as a unit to effect rapid changeovers and simplicity in installation and operation.

The only modifications within the connector circuit are in the internal interrupter circuit on a terminal strip, with contacts 31 to 40 being affected. Actually, if desired, these connections can remain unchanged, with full frequency selective service being obtained, but the subscriber will still hear the same number of rings as in the past, which may be as much as four longs and four shorts, etc. Since this is inconvenient, simplified ringing of one ring and two rings is desired, and the previously mentioned strapping changes are affected, these changes will give one ring on the tip side for odd digits, with two rings on the ring side for even digits. It is obvious that these rings may be changed in any manner desired by the strapping on contacts 31 through 40. Further, if, in some installations, it is desired that only one ring be heard on both tip and ring, all of the contacts 32 through 40 could be cut and multipled over to contact 31, so that it is apparent that this final selection is a matter for individual choice.

It is apparent that this conversion apparatus can be used with any dial code ringing switchboard in which pulsing is applied and ringing is selected when a particular digit is dialed. It is further apparent that various changes and modifications may be made within the teachings of this invention, and such changes and modifications as appear to those skilled in the art are within the scope of said invention as defined by the claims appended hereto.

What is claimed is:

1. A selective ringing apparatus adapted for use in a dial telephone system having means for supplying pulsing current for the dialed ringing digit, and means for selecting between the tip and ring side of the line in response to the dialing of an odd or even ringing digit said apparatus comprising an impulse counter responsive to the number of the digit dialed, a plurality of separate selective ringing sources, means in said impulse counter for applying a selected ringing source to the telephone system in response to a particular digit dialed, said impulse counter having a sequence of contact sets adapted to be operated by energizing means within said counter responsive to the number of pulses in said pulsing current corresponding to the ringing digit dialed, means for applying a selected ringing source through said contact sets responsive to the numerical value of said ringing digit, said ringing source applying means including strapping means within the impulse counter for applying the same ringing source for a consecutive pair of digits, and means for restoring said impulse counter to a nonoperated position upon the completion of a call, said restoring means including reverse energizing means for restoring said contact sets to normal, said reverse energizing means including a control circuit which is partially set up by the first pulse of said pulsing current and which is completed by means actuated by the completion of the call upon hanging-up.

2. Selective ringing apparatus for use in telephone systems having dial signaling provisions, said ringing apparatus comprising an impulse counter responsive to the number of the digit dialed, a plurality of separate selective ringing sources, means in said impulse counter for applying a selected ringing source to the telephone system in response to a particular digit dialed, and means for restoring said impulse counter to a nonoperated position upon the completion of a call, said restoring means including reverse energizing means for restoring the impulse counter to normal, said reverse energizing means including a control circuit which is partially set up by the first pulse of current to said impulse counter and which is completed by means actuated by the completion of the call upon hanging-up.

3. A selective ringing apparatus adapted for use in a dial telephone system having means for supplying pulsing current for the dialed ringing digit, and means for selecting between the tip and ring side of the line in response to the dialing of an odd or even ringing digit said apparatus comprising an impulse counter responsive to the number of the digit dialed, a plurality of separate selective ringing sources, means in said impulse counter for applying a selected ringing source to the telephone system in response to a particular digit dialed, said impulse counter having a sequence of contact sets adapted to be operated by energizing means within said counter responsive to the number of pulses in said pulsing current corresponding to the ring digit dialed, means for applying a selected ringing source through said contact sets responsive to the numerical value of said ringing digit, said ringing source applying means including strapping means within the impulse counter for applying the same ringing source for a consecutive pair of digits, and means for distinguishing between the tip and the ring side of the line when the same ringing source is sent out by the impulse counter responsive to two numerically consecutive digits.

4. A selective ringing apparatus adapted for use in a dial telephone system having an interrupter circuit, means for supplying pulsing current of the dialed ringing digit, and means for selecting between the tip and ring side of the line in response to the dialing of an odd or even ringing digit, said apparatus comprising an impulse counter responsive to the number of the digit dialed, a plurality of separate selective ringing sources, means in said impulse counter for applying a selected ringing source to the telephone system in response to a particular digit dialed, and means for distinguishing between the tip and the ring side of the line when the same ringing source is sent out by the impulse counter responsive to two numerically consecutive digits, said means including connecting in multiple all even numbered leads in the interrupter circuit in the dial telephone system and separately connecting in multiple all odd numbered leads in the interrupter circuit.

5. Apparatus for converting a code ringing dial telephone system to selective ringing in which the code ringing system has means for supplying single frequency ringing current to the line, means for supplying pulsing current for the dialed ringing digit, and means for selecting between the tip and ring side of the line in response to the dialing of an odd or even ringing digit, said converting apparatus comprising an impulse counter responsive to the number of the digit dialed, a plurality of separate selective ringing sources, means in said impulse counter for applying a selected ringing source to the telephone system in response to a particular digit dialed, and means for restoring said impulse counter to a nonoperated position upon the completion of a call.

6. Apparatus for converting a code ringing dial telephone system to selective ringing in which the code ringing system has means for supplying single frequency ringing current to the line, means for supplying pulsing current for the dialed ringing digit, and means for selecting between the tip and ring side of the line in response to the dialing of an odd or even ringing digit, said converting apparatus comprising an impulse counter responsive to the number of the digit dialed, a plurality of separate selective ringing sources, means in said impulse counter for applying a selected ringing source to the telephone system in response to a particular digit dialed, and means for cutting over by stages the code ringing to selective ringing by consecutive digit pairs.

7. Apparatus for converting a code ringing dial telephone system to selective ringing in which the code ringing system has means for supplying single frequency ringing current to the line, means for supplying pulsing current for the dialed ringing digit, and means for selecting between the tip and ring side of the line in response to the dialing of an odd or even ringing digit, said converting apparatus comprising an impulse counter responsive to the number of the digit dialed, a plurality of separate selective ringing sources, means in said impulse counter for applying a selected ringing source to the telephone system in response to a particular digit dialed, said impulse counter having a sequence of contact sets adapted to be operated by energizing means within said counter responsive to the number of pulses in said pulsing current corresponding to the ringing digit dialed, and means for applying a selected ringing source through said contact sets responsive to the numerical value of said ringing digit, and means for cutting over by stages the code ringing to selective ringing by consecutive digit pairs.

8. Apparatus for converting a code ringing dial telephone system to selective ringing in which the code ringing system has means for supplying single frequency ringing current to the line, means for supplying pulsing current for the dialed ringing digit, and means for selecting between the tip and ring side of the line in response to the dialing of an odd or even ringing digit, said converting apparatus comprising an impulse counter responsive to the number of the digit dialed, a plurality of separate selective ringing sources, means in said impulse counter for applying a selected ringing source to the telephone system in response to a particular digit dialed, said impulse counter having a sequence of contact sets adapted to be operated by energizing means within said counter responsive to the number of pulses in said pulsing current corresponding to the ringing digit dialed, means for applying a selected ringing source through said contact sets responsive to the numerical value of said ringing digit, means for cutting over by stages the code ringing to selective ringing by consecutive digit pairs, said last named means including strapping means for supplying the same frequency as that of the code ringing to all of said contact sets in the impulse counter, and means for selectively removing said strap means and connecting separate selective ringing sources to separate contact sets for each consecutive pair of ringing digits.

9. Apparatus for converting a code ringing dial telephone system to a selective ringing in which the code ringing system has means for supplying single frequency ringing current to the line, means for supplying pulsing current for the dialed ringing digit, and means for selecting between the tip and ring side of the line in response to the dialing of an odd or even ringing digit, said converting apparatus comprising an impulse counter responsive to the number of the digit dialed, a plurality of separate selective ringing sources, means in said impulse counter for applying a selected ringing source to the telephone system in response to a particular digit dialed, said impulse counter having a sequence of contact sets adapted to be operated by energizing means within said counter responsive to the number of pulses in each pulsing current corresponding to the ringing digit dialed, means for applying a selected ringing source through said contact sets responsive to the numerical value of said ringing digit, means for cutting over by stages the code ringing to selective ringing by consecutive digit pairs, said last named means including strapping means for supplying the same frequency as that of the code ringing to all of said contact sets in the impulse counter, means for selectively removing said strap means and connecting separate ringing sources to separate contact sets for each consecutive pair of ringing digits, and means for uncoding the ringing current sent out over said line which include disconnecting the leads in the interrupter circuit corresponding to the digit being converted and connecting them to a single retained lead in the interrupter circuit corresponding to the ringing signal to be sent out over the line.

10. Apparatus for converting a code ringing dial telephone system to selective ringing in which the code ringing system has means for supplying single frequency ringing current to the line, means for supplying pulsing current for the dialed ringing digit, and means for selecting between the tip and ring side of the line in response to the dialing of an odd or even ringing digit, said converting apparatus comprising an impulse counter responsive to the number of the digit dialed, a multiple frequency ringing source, means in said impulse counter for applying a selected ringing source to the telephone system in response to a particular digit dialed, and means for restoring said impulse counter to a nonoperated position upon the completion of a call, said restoring means including reverse energizing means for restoring said contact sets to normal, said reverse energizing means including a control circuit which is partially set up by the first pulse of said pulsing current and which is completed by means actuated by the completion of the call upon hanging-up.

11. Apparatus for converting a code ringing dial telephone system to selective ringing in which the code ringing system has means for supplying single frequency ringing current to the line, means for supplying pulsing current for the dialed ringing digit, and means for selecting between the tip and ring side of the line in response to the dialing of an odd or even ringing digit, said converting apparatus comprising an impulse counter responsive to the number of the digit dialed, a multiple frequency ringing source, means in said impulse counter for applying a selected ringing source to the telephone system in response to a particular digit dialed, means for restoring said impulse counter to a nonoperated position upon the completion of a call, said restoring means including reverse energizing means for restoring the impulse counter to normal, said reverse energizing means including a control circuit which is partially set up by the first pulse of said pulsing current and which is completed by means actuated by the completion of the call upon hanging-up, and means for distinguishing between the tip and ring side of the line when the same ringing source is sent out by the impulse counter responsive to two numerically consecutive digits.

12. Apparatus for converting a code ringing dial telephone system to selective ringing in which the code ringing system has means for supplying single frequency ringing current to the line, means for supplying pulsing current for the dialed ringing digit, and means for selecting between the tip and ring side of the line in response to the dialing of an odd or even ringing digit, said converting apparatus comprising an impulse counter responsive to the number of the digit dialed, a plurality of separate selective ringing sources, means in said impulse counter for applying a selected ringing source to the telephone system in response to a particular digit dialed, means for restoring said impulse counter to a nonoperated position upon the completion of a call, said impulse counter having a sequence of contact sets adapted to be operated by energizing means within said counter responsive to the number of pulses in said pulsing current corresponding to the ringing digit dialed, and means for applying a selected ringing source through said contact sets responsive to the numerical value of said ringing digit, said ringing source applying means including strapping means within the impulse counter for applying the same ringing source for a consecutive pair of digits by connecting a separate ringing source to two adjacent normally open lower contacts in said contact sets and connecting all of the normally closed upper contacts in said contact sets to the ringing equipment in said system.

13. Apparatus for converting a code ringing dial telephone system to selective ringing in which the code ringing system has means for supplying single frequency ringing current to the line, means for supplying pulsing current for the dialed ringing digit, and means for selecting between the tip and ring side of the line in response to the dialing of an odd or even ringing digit, said converting apparatus comprising an impulse counter responsive to the number of the digit dialed, a plurality of separate selective ringing sources, means in said impulse counter for applying a selected ringing source to the telephone system in response to a particular digit dialed, means for restoring said impulse counter to a nonoperated position upon the completion of a call, said impulse counter having a sequence of contact sets adapted to be operated by energizing means within said counter responsive to the number of pulses in said pulsing current corresponding to the ringing digit dialed, means for applying a selected ringing source through said contact sets responsive to the numerical value of said ringing digit, said ringing source applying means including strapping means within the impulse counter for applying the same ringing source for a consecutive pair of digits by connecting a separate ringing source to two adjacent normally open lower contacts in said contact sets and connecting all of the normally closed upper contacts in said contact sets to the ringing equipment in said system, and said restoring means including reverse energizing means for restoring said contact sets to normal, said reverse energizing means including a control circuit which is partially set up by the first pulse of said pulsing current and which is completed by means actuated by the completion of the call upon hanging-up.

References Cited in the file of this patent

UNITED STATES PATENTS 1,405,175 Yanchowski ------------ Jan. 31, 1922
2,633,496 Duhamel -------------- Mar. 31, 1953
2,680,780 Lomax ---------------- June 8, 1954